(12) United States Patent
Whitlow

(10) Patent No.: US 10,197,168 B1
(45) Date of Patent: Feb. 5, 2019

(54) ENERGIZED SPRING SEAL FOR A FLOATING VALVE SEAT

(71) Applicant: Technetics Group, LLC, Charlotte, NC (US)

(72) Inventor: Mark Whitlow, Columbia, SC (US)

(73) Assignee: Technetics Group LLC, Charlotte, NC (US)

( * ) Notice: Subject to any disclaimer, the term of this patent is extended or adjusted under 35 U.S.C. 154(b) by 0 days.

(21) Appl. No.: 14/289,317

(22) Filed: May 28, 2014

Related U.S. Application Data

(60) Provisional application No. 61/829,836, filed on May 31, 2013.

(51) Int. Cl.
   *F16K 5/06* (2006.01)
   *F16K 5/20* (2006.01)

(52) U.S. Cl.
   CPC .......... *F16K 5/0689* (2013.01); *F16K 5/0678* (2013.01); *F16K 5/205* (2013.01)

(58) Field of Classification Search
   CPC ...... F16K 5/0689; F16K 5/0663; F16K 5/207; F16K 5/205; F16K 5/0673; F16K 5/0678; F16K 5/201
   USPC ...... 251/174, 172, 160, 192, 315.01–315.16, 251/314, 316, 317, 359, 360, 362, 363, 251/364, 175, 180–185
   See application file for complete search history.

(56) References Cited

U.S. PATENT DOCUMENTS

| | | | | |
|---|---|---|---|---|
| 2,390,201 A * | 12/1945 | Bredenbeck | .......... | F16K 5/0464 251/174 |
| 2,480,529 A * | 8/1949 | Waag | .......... | F16K 5/0464 251/174 |
| 2,799,470 A * | 7/1957 | Margrave | .......... | F16K 5/0464 251/172 |
| 2,868,497 A * | 1/1959 | Graham | .......... | F16K 5/0464 251/172 |
| 2,929,606 A * | 3/1960 | Kaiser | .......... | F16K 5/0694 251/174 |
| 3,045,693 A * | 7/1962 | Allen | .......... | F16K 5/0626 137/315.21 |
| 3,062,238 A * | 11/1962 | Boyd | .......... | F16J 3/047 251/172 |
| 3,091,428 A * | 5/1963 | Magos | .......... | F16K 27/067 251/174 |
| 3,097,823 A * | 7/1963 | Kaiser | .......... | F16K 5/0678 251/172 |
| 3,118,649 A * | 1/1964 | Herbert | .......... | F16K 5/0673 251/309 |

(Continued)

FOREIGN PATENT DOCUMENTS

FR        2202572 A5 * 5/1974 .......... F16K 5/0626
FR        2469632 A1 * 5/1981 ............ F16K 5/207

*Primary Examiner* — Reinaldo Sanchez-Medina
*Assistant Examiner* — David Colon Morales
(74) *Attorney, Agent, or Firm* — Perkins Coie LLP

(57) ABSTRACT

The technology of the present application provides a floating ball valve. The ball valve includes a valve body having a recess or chamber and a ball contained in the recess. A valve seat forms a sealing relationship between the ball and the fluid conduit. The valve seat has a resilient seat or member formed on the valve seat that confronts a surface of the ball. An energized spring seal on the opposite side forms a seal between the valve body and the valve seat and pushes the resilient seat towards the ball.

16 Claims, 2 Drawing Sheets

(56) References Cited

U.S. PATENT DOCUMENTS

| | | | | |
|---|---|---|---|---|
| 3,118,650 A * | 1/1964 | Cooper | F16K 5/0678 | 137/625.41 |
| 3,123,078 A * | 3/1964 | Brooks | F16K 5/227 | 137/246.22 |
| 3,132,837 A * | 5/1964 | Britton | F16K 5/0673 | 251/172 |
| 3,195,857 A * | 7/1965 | Shafer | F16K 5/0647 | 251/170 |
| 3,210,042 A * | 10/1965 | Freeman | F16K 5/0678 | 251/175 |
| 3,219,055 A * | 11/1965 | Dumm | F16K 5/0636 | 137/315.2 |
| 3,266,769 A * | 8/1966 | Shand | F16K 5/0673 | 251/172 |
| 3,267,558 A * | 8/1966 | Wilson | F16K 5/0663 | 251/315.03 |
| 3,269,692 A * | 8/1966 | Shafer | F16K 5/0673 | 251/172 |
| 3,301,523 A * | 1/1967 | Lowrey | F16K 3/0227 | 251/172 |
| 3,323,542 A * | 6/1967 | Magos | F16K 5/201 | 137/315.19 |
| 3,335,999 A * | 8/1967 | Lowrey | F16K 3/0227 | 251/172 |
| 3,361,407 A * | 1/1968 | Sachnik | F16K 5/0673 | 251/317 |
| 3,372,901 A * | 3/1968 | Manor | F16K 5/0668 | 251/315.05 |
| 3,378,026 A * | 4/1968 | Oliver | F16K 5/0673 | 137/246.22 |
| 3,380,706 A * | 4/1968 | Scaramucci | F16K 5/0631 | 251/148 |
| 3,380,708 A * | 4/1968 | Scaramucci | F16K 5/0642 | 251/172 |
| 3,387,815 A * | 6/1968 | Richards | F16K 5/0642 | 251/174 |
| 3,394,915 A * | 7/1968 | Gachot | F16K 5/0631 | 251/174 |
| 3,405,910 A * | 10/1968 | Scaramucci | F16K 5/0631 | 251/148 |
| 3,414,233 A * | 12/1968 | Priese | F16K 5/0678 | 251/172 |
| 3,416,558 A * | 12/1968 | Works | F16K 5/0673 | 137/246.22 |
| 3,428,292 A * | 2/1969 | Scaramucci | F16K 5/0631 | 251/151 |
| 3,445,087 A * | 5/1969 | Davies | F16K 5/0636 | 251/172 |
| 3,472,270 A * | 10/1969 | Masheder | F16K 5/0631 | 137/315.19 |
| 3,476,356 A * | 11/1969 | Scaramucci | F16K 3/0227 | 251/151 |
| 3,497,177 A * | 2/1970 | Hulsey | F16K 3/0227 | 251/172 |
| 3,504,885 A * | 4/1970 | Hulsey | F16K 3/0227 | 251/172 |
| 3,508,736 A * | 4/1970 | Pool | F16K 5/0673 | 251/172 |
| 3,520,512 A * | 7/1970 | Huber | F16K 5/0626 | 251/172 |
| 3,521,855 A * | 7/1970 | Jensen | F16K 5/0673 | 251/172 |
| 3,533,597 A * | 10/1970 | Bolling | F16K 5/201 | 251/174 |
| 3,542,335 A * | 11/1970 | Scaramucci | F16K 5/0673 | 251/172 |
| 3,554,485 A * | 1/1971 | Richards | F16K 5/0626 | 251/172 |
| 3,575,198 A * | 4/1971 | Ellis | F16K 5/0673 | 137/315.18 |
| 3,576,309 A * | 4/1971 | Zawacki | F16K 5/0636 | 137/327 |
| 3,604,682 A * | 9/1971 | Richards | F16K 5/0673 | 251/174 |
| 3,610,569 A * | 10/1971 | Reaves | F16K 3/0254 | 251/159 |
| 3,617,025 A * | 11/1971 | Gerbic | F16K 5/205 | 251/172 |
| 3,656,498 A * | 4/1972 | Grove | F16K 5/0673 | 137/246.22 |
| 3,667,727 A * | 6/1972 | Bowden | F16K 5/0673 | 251/172 |
| 3,712,585 A * | 1/1973 | Grenier | F16K 5/0642 | 251/172 |
| 3,749,357 A * | 7/1973 | Fowler | F16K 3/207 | 251/172 |
| 3,760,833 A * | 9/1973 | Kemp | F16K 5/0673 | 137/246.22 |
| 3,765,647 A * | 10/1973 | Grove | F16K 3/0227 | 251/317 |
| 3,776,506 A * | 12/1973 | Fowler | F16K 5/205 | 251/172 |
| 3,794,291 A * | 2/1974 | Suyama | F16K 5/0673 | 251/171 |
| 3,827,671 A * | 8/1974 | Bolden | F16K 5/06 | 251/172 |
| 3,834,664 A * | 9/1974 | Atkinson | F16K 5/0673 | 251/172 |
| 3,950,628 A * | 4/1976 | Hruda | H01H 9/04 | 200/302.1 |
| 4,113,229 A * | 9/1978 | Fujiwara | F16K 5/0647 | 251/174 |
| 4,147,327 A * | 4/1979 | Moran | F16K 5/0668 | 251/172 |
| 4,151,855 A * | 5/1979 | Levin | F16K 5/0636 | 137/15.22 |
| 4,175,577 A * | 11/1979 | Kacal | F16K 5/0636 | 137/15.22 |
| 4,195,655 A * | 4/1980 | Augsburger | F16K 49/005 | 137/334 |
| 4,215,722 A * | 8/1980 | Sigmon | F16K 5/207 | 137/625.3 |
| 4,217,923 A * | 8/1980 | Kindersley | F16K 5/0636 | 137/315.21 |
| 4,235,418 A * | 11/1980 | Natalizia | F16K 5/0626 | 251/174 |
| 4,254,793 A * | 3/1981 | Scaramucci | F16K 5/0673 | 137/246.22 |
| 4,286,614 A * | 9/1981 | Kacal | F16K 5/0673 | 137/246.22 |
| 4,318,420 A * | 3/1982 | Calvert | F16K 5/0673 | 137/74 |
| 4,410,165 A * | 10/1983 | Koch | F16K 5/0673 | 251/172 |
| 4,428,561 A * | 1/1984 | Thompson | F16K 5/0678 | 251/171 |
| 4,477,055 A * | 10/1984 | Partridge | F16K 5/0673 | 137/328 |
| 4,483,511 A * | 11/1984 | Kushida | F16K 5/201 | 251/172 |
| 4,509,546 A * | 4/1985 | Brookes | F16K 5/0673 | 137/74 |
| 4,513,947 A * | 4/1985 | Amend | F16K 3/20 | 251/159 |
| 4,519,412 A * | 5/1985 | Grazioli | F16K 5/0673 | 137/315.19 |
| 4,557,286 A * | 12/1985 | Nagano | F16K 5/0673 | 137/72 |
| 4,566,482 A * | 1/1986 | Stunkard | F16K 5/0636 | 137/240 |
| 4,582,080 A * | 4/1986 | Stock | F16K 1/2285 | 137/74 |
| 4,601,308 A * | 7/1986 | Stone | F16K 5/0631 | 137/315.21 |
| 4,658,847 A * | 4/1987 | McCrone | E06B 5/164 | 137/72 |
| 4,718,444 A * | 1/1988 | Boelte | F16K 5/0636 | 137/15.22 |

(56) References Cited

U.S. PATENT DOCUMENTS

| | | | | |
|---|---|---|---|---|
| 4,747,578 A * | 5/1988 | Kivipelto | ............... | F16K 5/207 |
| | | | | 251/159 |
| 4,778,148 A * | 10/1988 | Kruger | ............... | F01L 7/16 |
| | | | | 123/190.17 |
| 4,792,117 A * | 12/1988 | Kubota | ............... | C08L 27/18 |
| | | | | 251/315.05 |
| 4,815,701 A * | 3/1989 | Stone | ............... | F16K 5/0673 |
| | | | | 251/174 |
| 5,101,853 A * | 4/1992 | Mailliet | ............... | B65G 53/46 |
| | | | | 137/242 |
| 5,163,655 A * | 11/1992 | Chickering, III | ....... | F16K 5/201 |
| | | | | 251/174 |
| 5,322,261 A * | 6/1994 | Aarnes | ............... | F16K 5/205 |
| | | | | 251/159 |
| 5,482,249 A * | 1/1996 | Schafbuch | ............... | F16K 47/08 |
| | | | | 138/44 |
| 5,533,738 A * | 7/1996 | Hoffmann | ............... | F16K 5/205 |
| | | | | 251/172 |
| 5,595,206 A * | 1/1997 | Soria Vega | ............... | F16K 27/067 |
| | | | | 137/15.22 |
| 5,624,101 A * | 4/1997 | Beson | ............... | F16K 3/20 |
| | | | | 251/172 |
| 5,730,420 A * | 3/1998 | Tow | ............... | F16K 5/0689 |
| | | | | 251/315.05 |
| 5,927,687 A * | 7/1999 | Krause | ............... | F16K 5/0689 |
| | | | | 222/368 |
| 6,082,707 A * | 7/2000 | Hosie | ............... | F16K 5/0678 |
| | | | | 251/172 |
| 6,340,029 B1 * | 1/2002 | Jun | ............... | F16K 1/228 |
| | | | | 137/1 |
| 6,345,805 B1 * | 2/2002 | Chatufale | ............... | F16K 5/0471 |
| | | | | 251/172 |
| 6,439,334 B1 * | 8/2002 | Myers | ............... | F02M 21/0224 |
| | | | | 137/899 |
| 6,988,708 B2 * | 1/2006 | Caprera | ............... | F16K 1/2265 |
| | | | | 251/171 |
| 7,032,880 B2 * | 4/2006 | Scaramucci | ............... | F16K 5/0678 |
| | | | | 251/172 |
| 7,275,564 B2 * | 10/2007 | Bazin | ............... | F16K 5/201 |
| | | | | 137/625.47 |
| 7,484,710 B2 * | 2/2009 | Koester | ............... | 251/160 |
| 7,635,113 B2 * | 12/2009 | Bearer | ............... | F16K 5/0678 |
| | | | | 251/174 |
| 7,988,127 B2 * | 8/2011 | Parra | ............... | F16K 5/0673 |
| | | | | 251/172 |
| 8,113,484 B2 * | 2/2012 | Hostetter | ............... | F16K 5/0678 |
| | | | | 251/174 |
| 8,424,841 B2 | 4/2013 | Frenzel | | |
| 8,496,226 B2 | 7/2013 | Dalluge et al. | | |
| 8,720,854 B2 | 5/2014 | Dalluge et al. | | |
| 2006/0231786 A1 * | 10/2006 | Witt | ............... | F16K 5/0678 |
| | | | | 251/174 |
| 2010/0229962 A1 * | 9/2010 | Frenzel | ............... | F16J 15/0887 |
| | | | | 137/315.19 |
| 2011/0266481 A1 | 11/2011 | Collison et al. | | |
| 2011/0266482 A1 | 11/2011 | Dalluge et al. | | |
| 2011/0266484 A1 | 11/2011 | Dalluge et al. | | |
| 2012/0217425 A1 * | 8/2012 | Beasley | ............... | F16K 5/0678 |
| | | | | 251/174 |
| 2013/0015383 A1 * | 1/2013 | Anderson | ............... | F16K 5/207 |
| | | | | 251/314 |

* cited by examiner

ENERGIZED SPRING SEAL FOR A FLOATING VALVE SEAT

CROSS-REFERENCE TO RELATED PATENT APPLICATIONS

This application claims the benefit of U.S. Provisional Patent Application No. 61/829,836 entitled "ENERGIZED SPRING SEAL FOR FLOATING VALVE SEAT", which was filed on May 31, 2013, the contents of which are all incorporated by reference herein.

BACKGROUND

The present application relates to a floating ball valve seat and, more particularly, to providing one or more resilient metal seals in a valve seat for a trunnion ball valve.

A ball valve provides a rotatable sphere, disc, or cylinder (generically the "ball") in a flow path. The ball has a through hole that may be rotated into and out of alignment with the flow path to either allow or prevent the fluid to flow.

A conventional ball valve 10 is shown in FIG. 1. The conventional ball valve 10 comprises a valve body 12, a valve seat 14, a ball 16, a valve stem 18, and a handle 20. The ball 16 has a bore 22 extending along a diameter of the ball 16. As shown in FIG. 1, the ball valve is being rotated from the open position 26 to the closed position 28 by rotating the handle 20 a counter clockwise direction shown by the arrow 24. As shown, the ball 16 has been partially rotated and may be considered in a throttle position 30 although ball valves such as ball valve 10 are not typically used for throttling.

Conventional ball valves may be designed for lower or higher pressure operation. To close the flow path, the pressure of the fluid acts against the ball or the valve seat to push the ball and valve seat together to stop the flow. A high pressure ball valve is often designed as a trunnion ball valve. The trunnion ball valve allows for upstream pressure on the upstream valve seat 14-u to press against the ball 16. The pressure on the upstream valve seat 14-u allows for a leak path between the valve body and the valve seat. In certain applications, the valve seat 16 is designed as a floating valve seat. In these cases, a conventional compression spring may be provided between the valve body and the valve seat. The compression spring forces the valve seat away from the valve body, exasperating the leak path between the valve body and valve seat, and into a sealing relationship with the ball.

As can be appreciated from the above, the valve seat 14 and the ball 16 need form a sealing relationship to prevent leaks. The valve seat 14 and ball 16 are formed into a sealing relationship by a conventional lapping procedure. Lapping the valve seat 14 provides a ball seat that is perfectly spherical to match the curvature of the spherical ball. The lapping procedure is relative straight forward and convention, but adds costs to manufacturing of the valve.

Against the above background, it is desirable to provide an improved floating ball valve seat.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In certain embodiments, the technology of the present application provides a floating ball valve. The ball valve includes a valve body having a recess or chamber and a ball contained in the recess. A valve seat forms a sealing relationship between the ball and the fluid conduit. The valve seat has a resilient seat or member formed on the valve seat that confronts a surface of the ball. An energized spring seal on the opposite side forms a seal between the valve body and the valve seat and pushes the resilient seat towards the ball.

These and other aspects of the present system and method will be apparent after consideration of the Detailed Description and Figures herein.

DRAWINGS

Non-limiting and non-exhaustive embodiments of the technology of the present application, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the exemplary embodiments set forth herein. The following detailed description is, therefore, not to be taken in a limiting sense. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
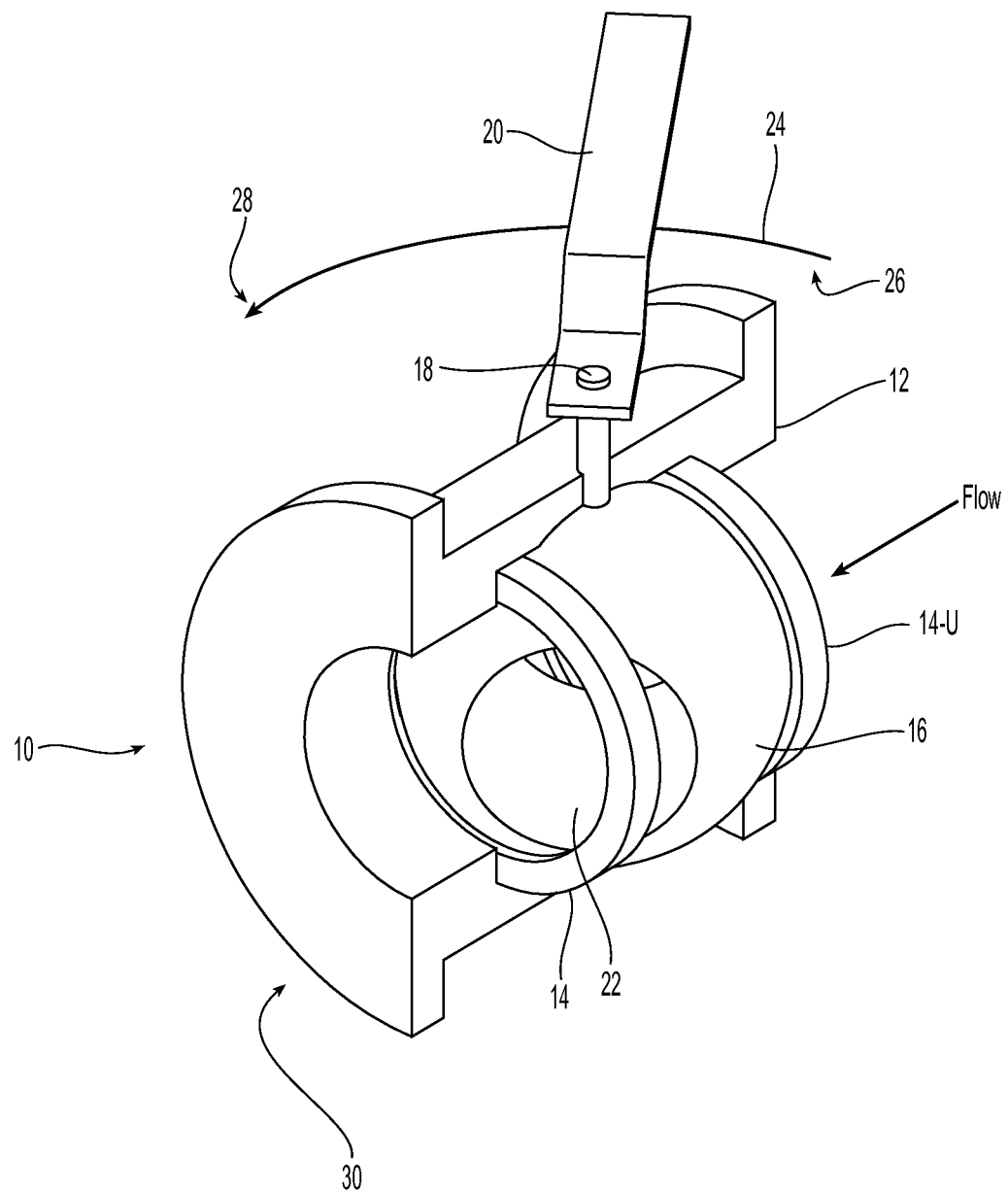
FIG. 1 depicts a perspective view of a prior art ball valve in the process of rotating between a closed and opened position.
Figure 2:
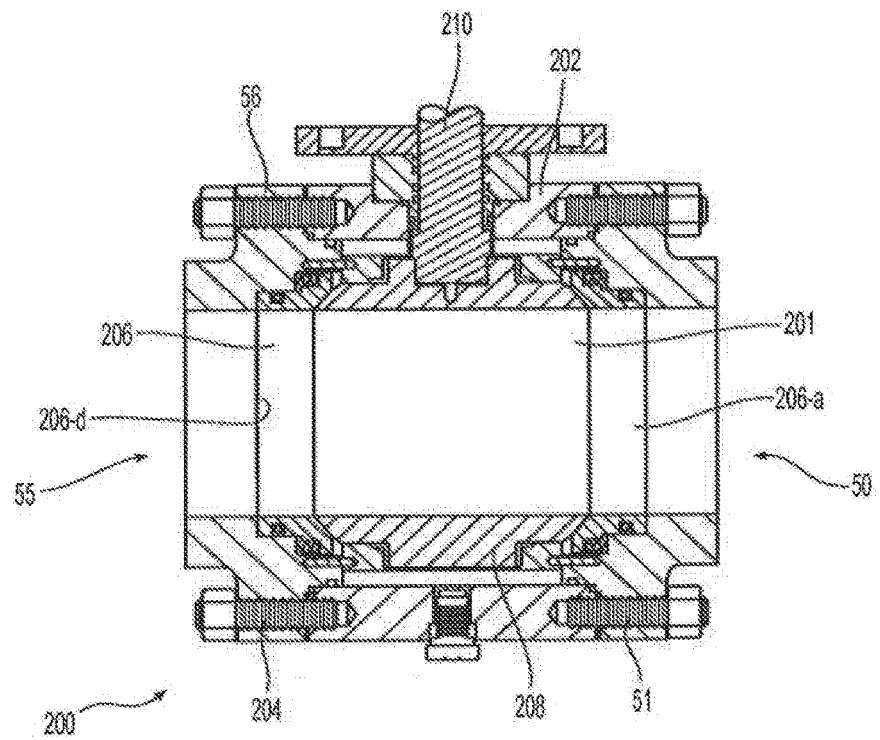
FIG. 2 depicts a cross-sectional view of a ball valve consistent with the technology of the present application.

With reference to FIG. 2, a cross-sectional view of a trunnion ball valve 200 consistent with the technology of the present application is provided. The trunnion ball valve 200 is mounted between an upstream fluid conduit 50 (or pipe 50) and a downstream fluid conduit 55 (or pipe 55). As can be appreciated, the trunnion ball valve 200 is shown in the open position 201.

The trunnion ball valve 200 has a valve body 202 that is bolted with bolts 204 to flanges 51, 56 on the upstream and downstream fluid conduits 50, 55. The valve body 202 contains an upstream and downstream valve seat 206 and a ball 208. A valve stem 210 is coupled to a ball 208 and extends out of the valve body 202. The valve stem 210 is coupled (or configured to be coupled) to a handle (not specifically shown in FIG. 2) that allows rotation of the ball 208 between the open position 201 (as shown) and the closed position (not shown).

Figure 3:
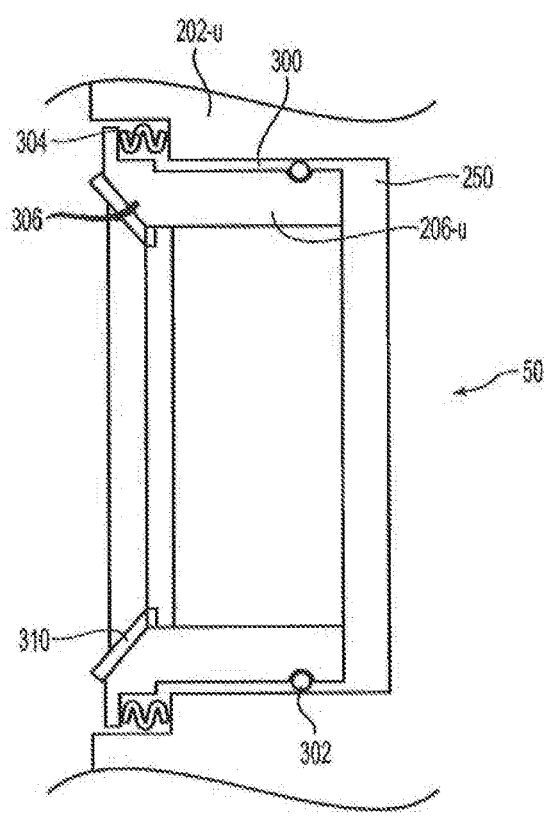
FIG. 3 depicts a cross-sectional view of the valve seat and fluid conduit of FIG. 2.

FIG. 3 shows the upstream valve body 202-*u*, and the upstream valve seat 206-*u*. It should be understood that the construction of the downstream valve seat 206-*d* would be substantially similar and is not shown herein for convenience. The upstream valve body 202-*u* provides a recess 250 that receives the upstream valve seat 206-*u*. The recess 250 is slightly larger than the upstream valve seat 206-*u* to allow fluid pressure to push against the valve seat 206-*u* such that the valve seat 206 and the ball 208 form a seal when the trunnion ball valve 200 is closed. The size differential between the valve seat 206 and the recess 250 allows for a potential leak path 300 about the valve seat 206-*u*. Conventionally, the leak path is sealed by a gasket 302, such as, for example, an O-ring as shown.

The valve seat 206 is allowed to float as described above. In other words, the valve seat 206 has the ability to move in the recess 250 and form a sealing relationship with the ball 208 to inhibit leaks. The trunnion ball valve 200 is provided with an energized secondary seal 304, which is shown in the form of an energized E-shape seal, such as is available from the Technetics Group LLC, with offices at 2791 The Blvd, Columbia, S.C. 29209. Other energized seal shapes, however, are possible including, for example, C-shape, U-shape, V-shape, W-shape, M-shape, etc. In certain applications, the seals may be formed of a resilient metal such as nickel alloys, stainless steel, etc. In other applications, the seals may be formed of plastics, composites, rubbers, or the like. In still other embodiments, the seals may be formed of a combination of metals and plastics. For example, a stainless steel V-shape metal seal may be coated with polytetrafluoroethylene (PTFE), perfluoroalkoxy (PFA), fluorinated ethylene propylene (FEP), ultra high molecular weight polyethylene (UHMWPE), and perfluoroelastomers, to name but a few coatings that could be applied to the metal seal. In one embodiment, the secondary seal being a metal seal provides for some resistance to fires and other high temperature applications where plastics may melt or the like. For example, if the O-ring 302 is formed of a rubber, it may melt during a fire condition or high temperature application. The metal secondary seal 304 effectively seals the leak path 300 when the first or primary seal 302 fails.

The energized secondary seal 304 performs the function of a spring as well. In particular, the energized secondary seal 304 resides in the recess 250, along the leak path 300, and is compressed between the valve body 202 and the valve seat 206. The compression of the energized secondary seal 304 causes the energized secondary seal 304 to function as the spring pressing the valve seat 206 against the ball 208.

The valve seat 206 comprises a seating surface 306 that mates with the ball 208. Conventionally, the seating surface 306 is lapped or otherwise prepared to mate with the ball 208 to form a seal. The technology of the present application provides a resilient seat 310 fixed to the seating surface 306. The resilient seat 310 generally provides wear resistance and low friction or lubricious connection. The resilient seat 310 may be comprised of PTFE or stainless steel material to name but two low friction resilient seat materials. The resilient seat 310 in certain applications may eliminate the need to lap or otherwise prepare the seating surface 306 to mate with the ball 208 as the resilient seat 310 will form to imperfections and still provide a seal. Providing the resilient seat 310 out of a ductile metal also provides a fire or heat resistant seal. In certain embodiments, the resilient seat 310 may be a metal coated with a polymer, such as PTFE, to provide a chemically inert seat but also provide a seal in the event of a high temperature event that degrades the polymer.

To form a unitized valve seat, the energized seal 304 and the resilient seat 310 may be fixed to the valve seat 206. For example, the energized seal 304 and the resilient seat 310 may be formed from one or more metal components. The metal may be welded to the valve seat 206 to form a unitized member.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Because many embodiments of the invention can be practiced without departing from the spirit and scope of the invention, the invention resides in the claims hereinafter appended.

What is claimed is:

1. A floating ball valve comprising:
a valve body, the valve body forming at least one recess;
at least one metal valve seat contained in the at least one recess and spaced apart from the valve body, the at least one metal valve seat comprising a metal sealing surface and a resilient seat coupled to and overlying the sealing surface, wherein a leak path is defined by a space between the valve body and the at least one metal seat;
a ball comprising a through hole along a diameter thereof, the at least one metal valve seat positioned between the valve body and the ball; and
at least one energized seal, wherein the energized seal comprises a metal seal, residing in the leak path between the valve body and the at least one metal valve seat and extending between the at least one metal valve seat and the valve body wherein the at least one energized seal seals between a valve chamber where the ball is positioned and the leak path and wherein a gasket residing in the leak path between the valve body and the at least one metal valve seat wherein the gasket seals between the leak path and a fluid conduit and wherein the at least one energized seal is elastic and compressed between the valve body and the at least one metal valve seat such that the ball and the resilient seat abut.

2. The floating ball valve of claim 1 wherein the metal seal is welded to the valve seat.

3. The floating ball valve of claim 1 wherein the resilient seat comprises a low friction material.

4. The floating ball valve of claim 3 wherein the low friction material comprises polytetrafluoroethylene.

5. The floating ball valve of claim 3 wherein the low friction material is stainless steel.

6. The floating ball valve of claim 3 wherein the low friction material is selected from the group of materials consisting of: perfluoroalkoxy (PFA), fluorinated ethylene propylene (FEP), ultra high molecular weight polyethylene (UHMWPE), or perfluoroelastomers.

7. The floating ball valve of claim 3 wherein the low friction material comprises a metal coated with a polymer.

8. The floating ball valve of claim 7 wherein the polymer is selected from the group of polymers consisting of: polytetrafluoroethylene (PTFE), perfluoroalkoxy (PFA), fluorinated ethylene propylene (FEP), ultra high molecular weight polyethylene (UHMWPE), or perfluoroelastomers.

9. The floating ball valve of claim 1 wherein the gasket comprises an O-ring.

10. A metal valve seat assembly for a ball valve comprising:
  a plurality of unitary metal valve seats to fit in a valve body, wherein the metal valve seats are configured to be spaced apart from the valve body wherein a space between the metal valve seats and the valve body defines a leak path, and wherein each of the plurality of unitary metal valve seats comprise:
  a first side and a second side opposite the first side,
  a metal seating surface on the first side shaped to operatively engage a ball;
  a resilient seat coupled to and overlying the seating surface such that when the seating surface operatively engages the ball, the resilient seat is between the metal seating surface and the ball;
  a primary seal coupled to the second side, the primary seal to form a seal between the valve seat and the ball valve body and configured to seal between the leak path and a pipe; and
  an energized secondary seal, wherein the energized secondary seal is a metal energized secondary seal, configured to reside in the leak path, the energized secondary seal coupled to the second side of the valve seat to compress the resilient seat onto a surface of the ball and to form a seal between the second side of the valve seat and the ball valve body and configured to seal between a valve chamber and the leak path.

11. The metal valve seat of claim 10 wherein the metal energized secondary seal is coated with a polymer.

12. The metal valve seat of claim 11 wherein the polymer is selected from a group of polymers consisting of: polytetrafluoroethylene (PTFE), perfluoroalkoxy (PFA), fluorinated ethylene propylene (FEP), ultra high molecular weight polyethylene (UHMWPE), or perfluoroelastomers.

13. The metal valve seat of claim 10 wherein the resilient seat is a metal resilient seat.

14. The metal valve seat of claim 13 wherein the metal resilient seat is coated with a polymer.

15. The metal valve seat of claim 14 wherein the polymer is selected from a group of polymers consisting of: polytetrafluoroethylene (PTFE), perfluoroalkoxy (PFA), fluorinated ethylene propylene (FEP), ultra high molecular weight polyethylene (UHMWPE), or perfluoroelastomers.

16. The metal valve seat of claim 10 wherein the primary seal comprises an O-ring.

* * * * *